(12) United States Patent
Huber

(10) Patent No.: US 7,217,074 B1
(45) Date of Patent: May 15, 2007

(54) APPARATUS FOR SAFETY SYSTEM FOR CARGO LOADS IN CARGO CONTAINERS

(76) Inventor: Mark W. Huber, P.O. Box 1663, Rainsville, AL (US) 35986

( * ) Notice: Subject to any disclaimer, the term of this patent is extended or adjusted under 35 U.S.C. 154(b) by 242 days.

(21) Appl. No.: 11/101,232

(22) Filed: Apr. 8, 2005

(51) Int. Cl.
*B60P 7/08* (2006.01)
(52) U.S. Cl. .......................... 410/118; 410/97; 410/100
(58) Field of Classification Search ................... 410/96, 410/97, 100, 117–118; 296/100.15, 100.16; 160/404; 150/154, 166; 135/100
See application file for complete search history.

(56) References Cited

U.S. PATENT DOCUMENTS

| 5,452,973 | A | 9/1995 | Arvin |
| 5,608,951 | A | 3/1997 | Chou |
| D411,506 | S | 6/1999 | Davis |
| 6,419,433 | B1 * | 7/2002 | Chou .......................... 410/97 |
| 6,626,620 | B1 | 9/2003 | Veal |
| 6,655,887 | B2 | 12/2003 | McDonald |
| 6,702,533 | B1 | 3/2004 | Williams |

* cited by examiner

*Primary Examiner*—Stephen Gordon

(57) ABSTRACT

The Safety System for Cargo Loads in Cargo Containers can be used to fulfill the need to provide a safe mechanism to transport oversized cargo without shifting or sliding in or out of the vehicle. The oval band like section can be wrapped around the cargo and the straps are used to secure the cargo to the carrier vehicle using hooks.

2 Claims, 3 Drawing Sheets

APPARATUS FOR SAFETY SYSTEM FOR CARGO LOADS IN CARGO CONTAINERS

1. FIELD

The present disclosure pertains to an apparatus for Safety System for Cargo Loads in Cargo Containers, in particular to fulfill the need for effectively securing longer or oversized cargo items being transported in vehicles where the hatch, trunk or tailgate is kept open to accommodate the cargo.

2. DESCRIPTION OF RELATED ART

The persistent need for an easy and safe method to keep the oversized cargo in place when being transported in vehicles where the hatch, trunk or tailgate is kept open to accommodate it is understood by do-it-yourself enthusiasts and laborers. Various methods have been invented in the past to provide a method to prevent oversized cargo from falling off during transportation.

Some of the prior patents are U.S. Pat. Nos. 6,702,533, 5,452,973, 5,608,951, 6,626,620, 6,655,887.

However, it has been found that the inventions related to prior patents are structurally and functionally different than the present one. For example, some of the prior patents have designs where the safety mechanism is based on nylon nets and does not secure cargo from shifting their positions during transportation. Some other prior patents have designs, which are unsuitable for securing cargo such as logs, pipes, wooden planks or any bundles material.

3. BRIEF DESCRIPTION OF THE FIGURES

The present invention is illustrated by way of an example and is not limited by the figures presented in the following sections:

FIG. 1 illustrates the prototype of one type of the embodiment, which is the Safety System for Cargo Loads in Cargo Containers. It shows the isometric view of the embodiment, which is the Safety System for Cargo Loads in Cargo Containers. FIG. 1 illustrates the oval section 101, the stretchable straps 102 and the strap hooks 103.

FIG. 2 illustrates the isometric view with the various parts of the embodiment, which is the Safety System for Cargo Loads in Cargo Containers shown in FIG. 1. FIG. 2 illustrates an alternate embodiment of the straps 102 of the present invention, which are the adjustable straps 104.

FIG. 3 illustrates the top view of the embodiment, which is the Safety System for Cargo Loads in Cargo Containers shown in FIG. 1. FIG. 3 illustrates the top view of the embodiment being used in a truck 105 with cargo 106 such as wooden planks. The cargo is secured using the embodiment with the help of the straps 102 and the hooks 103.

FIG. 4 illustrates the cargo 106 being secured with the straps 102.

4. DETAILED DESCRIPTION

The following description provides an apparatus for Safety System for Cargo Loads in Cargo Containers, in particular to provide a safety mechanism to transport oversized cargo. The following sections provide a description of the apparatus for Safety System for Cargo Loads in Cargo Containers, its specific details, its features and its advantages over the other prior models.

Figure 1:
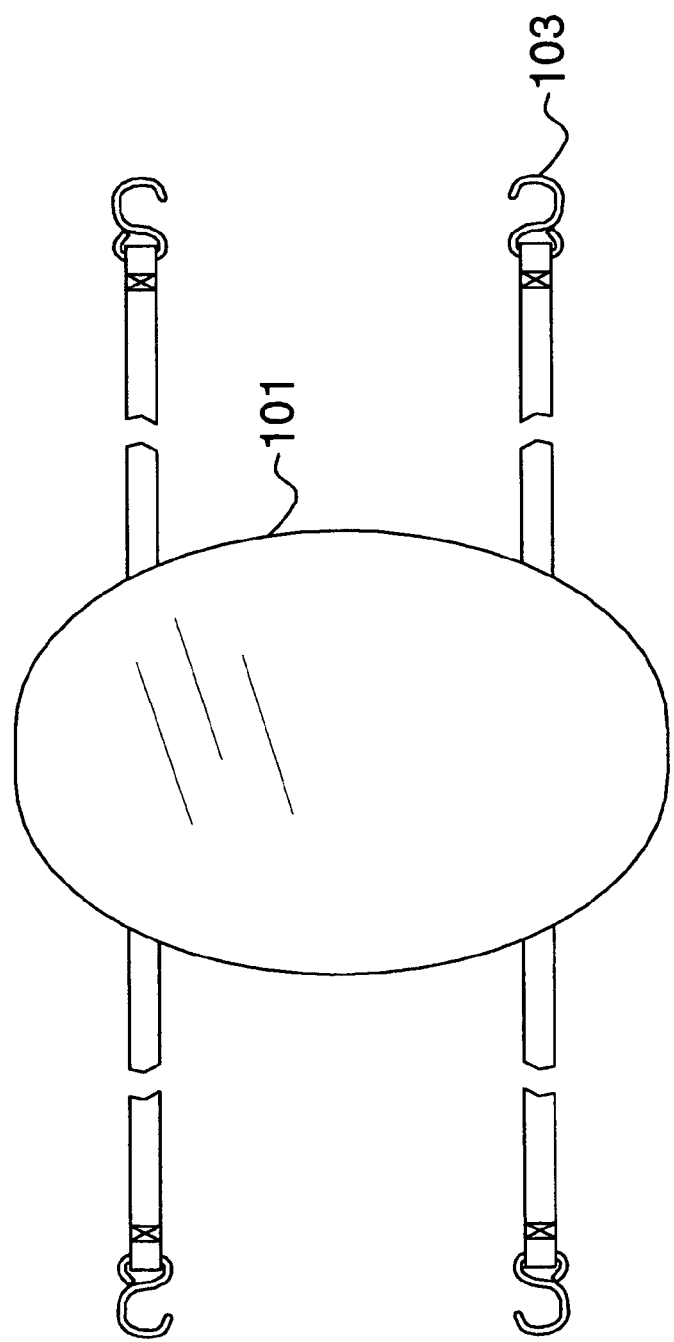

As previously discussed, some of the prior patents have designs where the safety mechanism is based on nylon nets and does not secure cargo from shifting their positions during transportation. Some other prior patents have designs, which are unsuitable for securing cargo such as logs, pipes, wooden planks or any bundles material. In contrast, the apparatus described as an embodiment in FIG. 1 is structurally different from all prior patents and endeavors to overcome the limitations faced by prior patents. It is an object of this invention to provide an effective means for transportation of oversized cargo by securing it. Another object of this invention is to provide a safe transport of cargo goods particularly when the vehicle's hatch, trunk or tailgate is left open to accommodate the oversized cargo. Another object of this invention is to prevent oversized cargo from falling off the vehicle onto the roadway during transportation. Another object of this invention is to prevent the materials in the cargo from shifting or sliding inside the vehicle during acceleration. Yet another object of this invention is to improve security of the cargo and the vehicles following the cargo container. It is another object of this invention to reduce the time taken to secure a cargo. It is yet another object of this invention to indicate the oversized cargo by having the embodiment in bright colors such as red, orange or yellow. In one embodiment, the cargo is placed in the bed of the vehicle, and the user wraps the oval section around the ends of the cargo and the straps are pulled tight and secured to the vehicle using hooks. This effectively provides a safe transportation to the cargo.

The apparatus for Safety System for Cargo Loads in Cargo Containers, described in the present invention is easy to manufacture, is easy to use, has a simple design, is practical, is convenient, is durable, and can be produced in different colors, sizes, and shapes.

DETAILED DESCRIPTION OF THE FIGURES

FIG. 1 illustrates the prototype of one type of the embodiment, which is the Safety System for Cargo Loads in Cargo Containers. It shows the isometric view of the embodiment, which is the Safety System for Cargo Loads in Cargo Containers. FIG. 1 illustrates the oval section 101, the stretchable straps 102 and the strap hooks 103. The oval section 101 is placed around the cargo and the straps are stretched and attached to predetermined places in the vehicle using the strap hooks 103. If produced, in one embodiment, the oval section 101 can be manufactured from canvas or nylon material and measures 24 inches in length and 12 inches in width or height, and could also be produced in a variety of sizes. In another example the straps 102 can be produced from stretchable rubber material or could feature adjustable strap designs 104. Each strap 102 has rubber-coated hooks 103 at the ends. The straps 102 are placed around the perimeter of the oval section 101.

Figure 2:
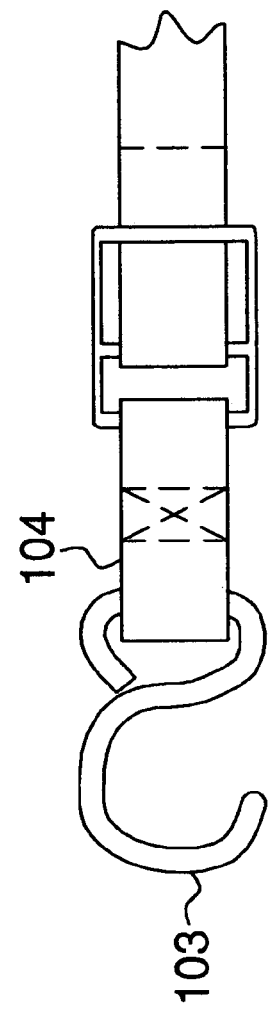

FIG. 2 illustrates the isometric view with the various parts of the embodiment, which is the Safety System for Cargo Loads in Cargo Containers shown in FIG. 1. FIG. 2 illustrates an alternate embodiment of the straps 102 of the present invention, which are the adjustable straps 104. The adjustable straps 104 are not elastic in nature and the tautness of the straps around the cargo can be adjusted using the adjusting mechanism.

Figure 3:
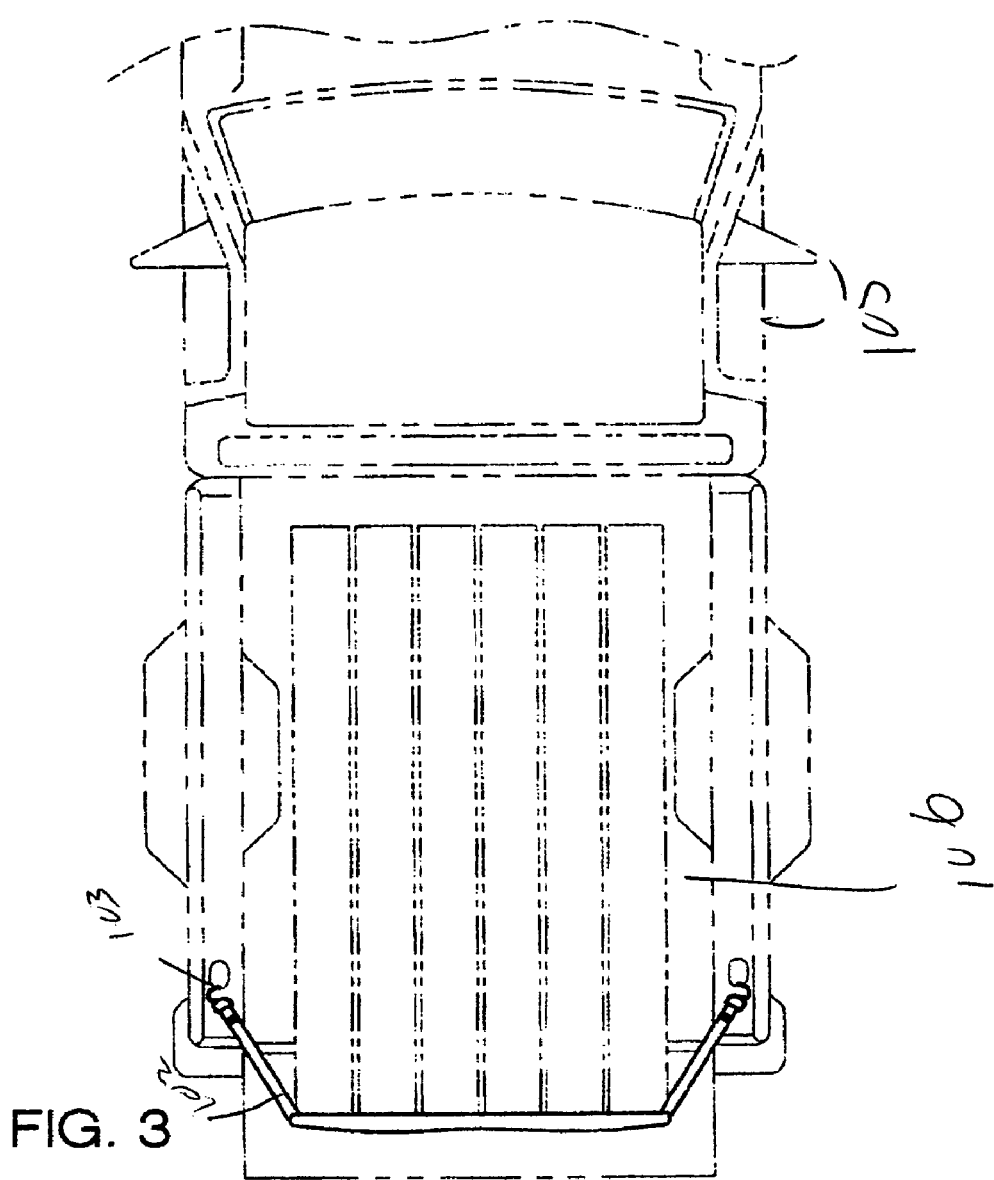

FIG. 3 illustrates the top view of the embodiment, which is the Safety System for Cargo Loads in Cargo Containers shown in FIG. 1. FIG. 3 illustrates the top view of the embodiment being used in a truck 105 with cargo 106 such as wooden planks. The cargo is secured using the embodiment with the help of the straps 102 and the hooks 103. The oversized cargo 106 that needs to be transported is placed inside the bed of a vehicle such as a truck 105. The back of the cargo 106, that is the end near the rear end of the truck 105 is secured first with the oval section 101 and the straps 102 are secured to the vehicle using hooks 103.

Figure 4:
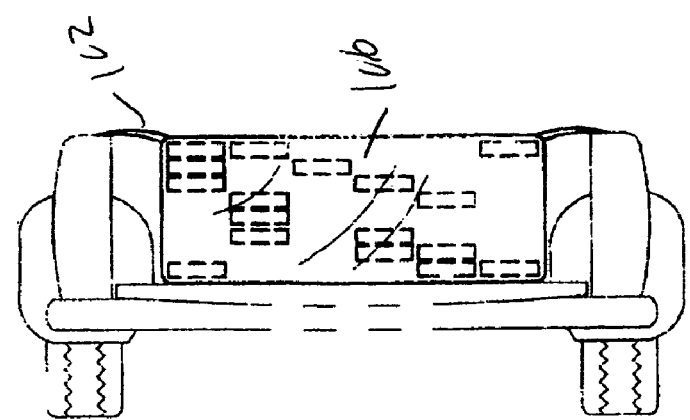
FIG. 4 illustrates the back view of the embodiment, shown in FIG. 1 being used in a truck.

FIG. 4 illustrates the back view of the embodiment, shown in FIG. 1 being used in a truck. FIG. 4 illustrates the cargo 106 being secured with the straps 102. The oval section 101 is secured around the cargo and the straps 102 are attached to the vehicle using hooks 103.

Figure 5:
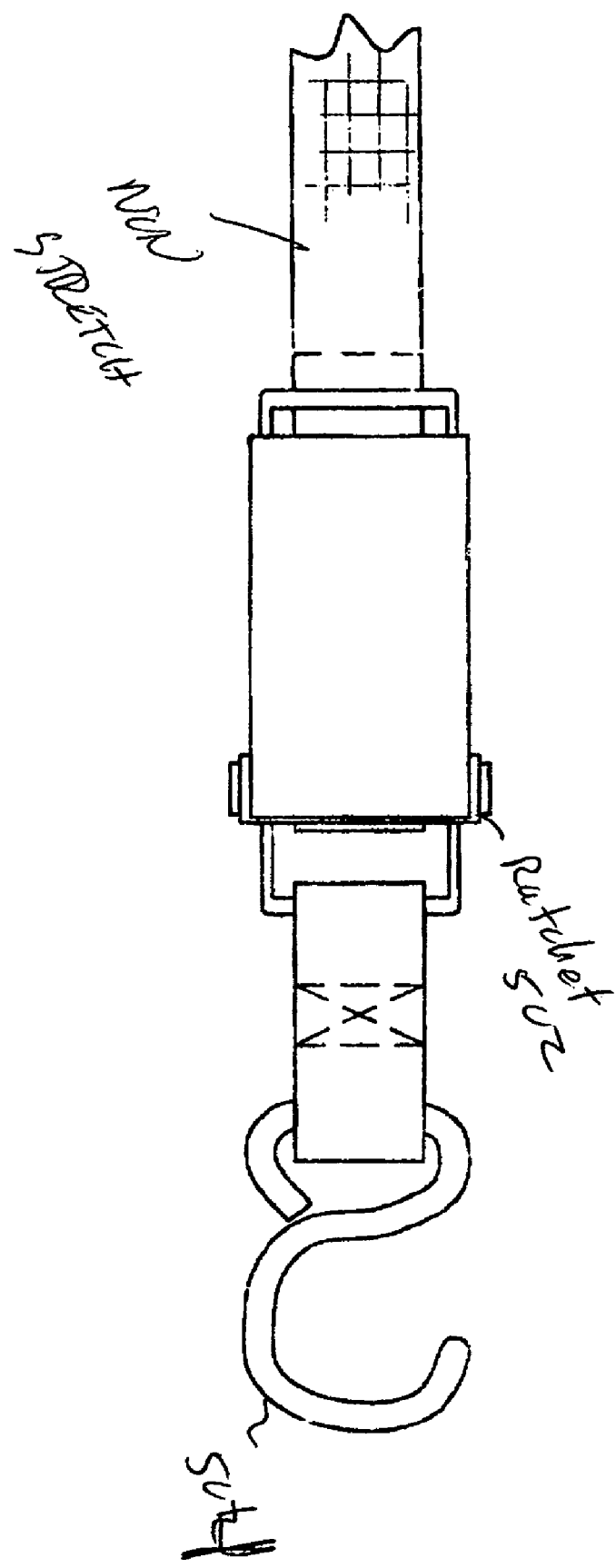
FIG. 5 illustrates the isometric view with the various parts of the alternative embodiment, which is the Safety System for Cargo Loads in Cargo wherein the material does not stretch and includes a ratchet 502.

FIG. 5 illustrates the isometric view with the various parts of the alternative embodiment, which is the Safety System for Cargo Loads in Cargo wherein the material does not stretch and includes a ratchet 502. In this embodiment, a ratchet 502 allows for heavy duty applications.

While certain exemplary embodiments have been shown and described in the accompanying drawings, it is to be understood that such embodiments are merely illustrative of and not restrictive on the broad invention, and that this invention not be limited to the specific constructions and arrangements shown and described, since various other modification may occur to those ordinarily skilled in the art upon studying this disclosure.

The invention claimed is:

1. A cargo strapping apparatus comprising:
an oval shaped canvas structure secured by four straps on an exterior perimeter of the structure; and
each strap made with a stretchable material and with a rubber coated hook on one end to facilitate securing the structure to a vehicle.

2. A cargo strapping apparatus comprising:
an oval shaped nylon structure with four adjustable straps with a ratchet on an exterior perimeter of the structure; and
each strap made with a non-stretchable material and with a rubber coated hook on one end to facilitate securing the structure to a vehicle.

* * * * *